(12) United States Patent
Littau et al.

(10) Patent No.: US 11,007,974 B2
(45) Date of Patent: May 18, 2021

(54) BELT RETRACTOR FOR MOTOR VEHICLES

(71) Applicant: TRW AUTOMOTIVE GMBH, Alfdorf (DE)

(72) Inventors: Friedrich Littau, Rienharz (DE); Jürgen Rink, Waldstetten (DE); Thomas Kielwein, Eschach (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 248 days.

(21) Appl. No.: 16/306,676

(22) PCT Filed: Jun. 1, 2017

(86) PCT No.: PCT/EP2017/063314
§ 371 (c)(1),
(2) Date: Dec. 3, 2018

(87) PCT Pub. No.: WO2017/207695
PCT Pub. Date: Dec. 7, 2017

(65) Prior Publication Data
US 2019/0291686 A1 Sep. 26, 2019

(30) Foreign Application Priority Data
Jun. 3, 2016 (DE) ...................... 10 2016 006 636.9

(51) Int. Cl.
*B60R 22/34* (2006.01)
*B60R 22/36* (2006.01)

(52) U.S. Cl.
CPC .............. *B60R 22/34* (2013.01); *B60R 22/36* (2013.01); *B60R 2022/3402* (2013.01)

(58) Field of Classification Search
CPC .. B60R 22/34; B60R 22/36; B60R 2022/3402
See application file for complete search history.

(56) References Cited

U.S. PATENT DOCUMENTS

| 4,307,852 A | 12/1981 | Seifert et al. |
| 5,333,906 A * | 8/1994 | Fujimura .............. B60R 22/405 242/382.6 |
| 2015/0041579 A1 | 2/2015 | Bedak et al. |

FOREIGN PATENT DOCUMENTS

| DE | 3421960 | 12/1985 |
| EP | 0335360 | 3/1989 |

* cited by examiner

*Primary Examiner* — Sang K Kim
(74) *Attorney, Agent, or Firm* — Tarolli, Sundheim, Covell & Tummnio LLP

(57) ABSTRACT

The invention relates to a belt retractor (10) for automotive vehicles, comprising a housing frame (12) including two opposed side walls (14, 16) each having a wall opening (18, 20), a belt reel (22) being rotatable about a reel axis (A) and extending in the axial direction from a sensor-side reel end (24) through the wall openings (18, 20) of the housing frame (12) to an opposite spring-side reel end (26), as well as a housing cover (28) being tightly connected to the housing frame (12), wherein the housing cover (28) forms a radially elastic pivot bearing (30) for the spring-side reel end (26) and wherein the spring-side reel end (26) of the belt reel (22) is fixed in the radial direction in a guiding-free manner and, resp., without any further guideway on the housing cover (28).

6 Claims, 4 Drawing Sheets

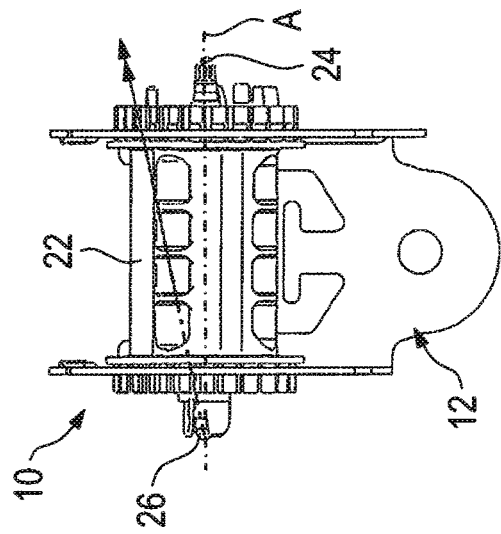
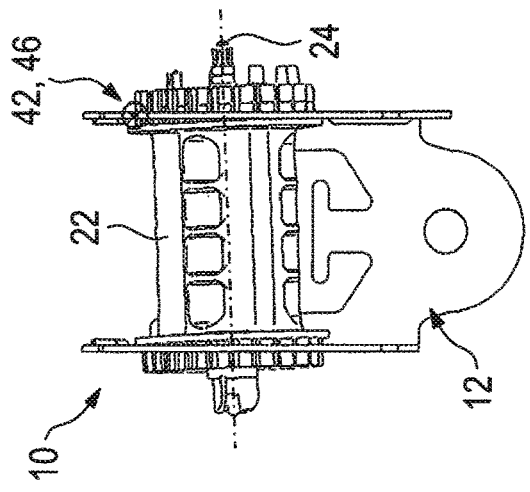
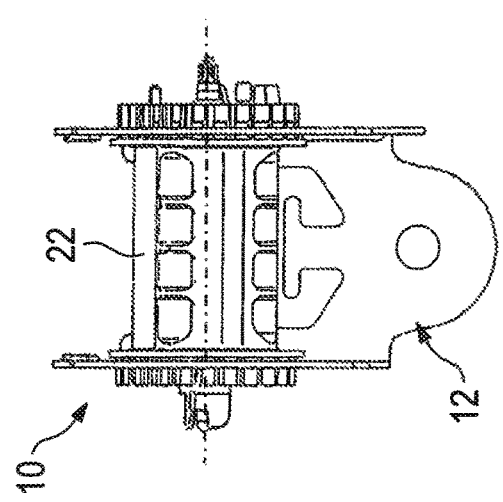
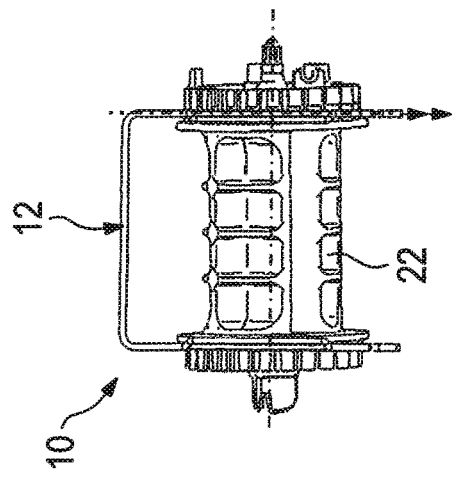
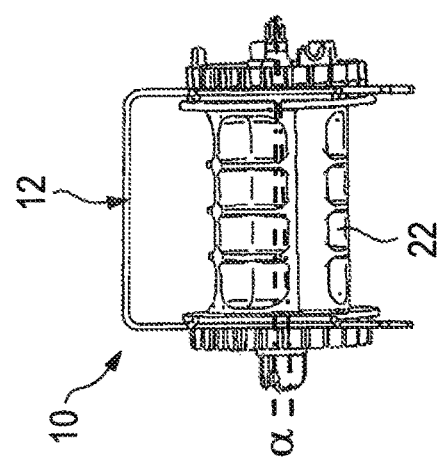
Fig. 9    Fig. 10    Fig. 11

BELT RETRACTOR FOR MOTOR VEHICLES

RELATED APPLICATIONS

This application corresponds to PCT/EP2017/063314, filed Jun. 1, 2017, which claims the benefit of German Application No. 10 2016 006 636.9, filed Jun. 3, 2016, the subject matter of which are incorporated herein by reference in their entirety.

BACKGROUND OF THE INVENTION

The invention relates to a belt retractor for automotive vehicles, comprising a housing frame having two opposed side walls each including a wall opening, a belt reel being rotatable about a reel axis and extending in the axial direction from a sensor-side reel end through the wall openings of the housing frame to an opposite spring-side reel end, as well as a housing cover which is tightly connected to the housing frame.

Belt retractors of this type are generally known from prior art and are widely used in the technical field of vehicle occupant restraint systems for automotive vehicles.

In conventional belt retractors the belt reel is supported to be radially movable within the housing frame for example between a release position in which the belt reel is freely rotatable and a locking position in which the belt reel is fixed to the housing frame in a rotationally fixed manner. Usually, in the case of restraint, the belt reel is pivoted initially on the sensor side and is radially moved to its locking position. When the webbing extension force exceeds a predetermined value, the belt reel is deflected via a radial guideway and against the spring force of a tensioning device even on the spring side and is radially moved to its locking position.

When the belt reel is in its locking position both on the sensor side and on the spring side, the reel axis again extends in parallel to the reel axis in the release position of the belt reel.

Said constructional design of the belt retractor is complicated as to manufacture and in the locking position of the belt reel moreover entails a strongly different moment loading of the belt reel on the sensor side and the spring side, which may result, in the extreme case, in an excessive sensor-side strain of the belt reel.

Therefore, it is the object of the invention to provide a belt retractor for automotive vehicles of simplified structure in which the sensor side and the spring side are loaded more evenly in the case of restraint.

SUMMARY OF THE INVENTION

In accordance with the invention, this object is achieved by a belt retractor of the afore-mentioned type in which the housing cover forms a radially elastic pivot bearing for the spring-side reel end, with the spring-side reel end of the belt reel being fixed in the radial direction in a guiding-free manner meaning without any further guideway on the housing cover. The radially elastic design of the pivot bearing causes a reset force to act when the spring-side reel end is radially deflecting, without guiding on a predetermined path taking place. The deflection of the spring-side reel end follows the webbing extension direction without any further guide elements or guideways being provided at the spring-side reel end. In other words, at the housing cover no radial guide is configured for defining a radially guided directed motion of the pivot bearing and thus of the spring-side reel end between a release position and a locking position of the belt reel. Instead, the pivot bearing is configured to be radially elastic and, thus, enables free radial motion in the direction of force without any predetermined or preferred swivel distance, when a predetermined webbing extension force is exceeded.

The swivel motion of the belt reel is guided only on the sensor-side reel end by a pivot lever about a defined pivot point on a predetermined path. Said guided motion does not occur on the spring-side reel end, instead the motion of the spring-side reel end may follow the direction of force given by the direction of the respective webbing extension and may engage in the locking teeth.

In accordance with the invention, the locking teeth at the spring-side reel end lag the locking teeth at the sensor-side reel end, preferably by an angle of from 4° to 10° in the webbing extension direction. Due to the bearing of the belt reel which is not radially guided on the spring side, said so-called "angle of lag" is especially large.

However, due to said bearing which is not radially guided on the spring side, the belt reel is no longer forced into a locking position in which the reel axis extends in parallel to the reel axis in the release position of the belt reel so that the moment loading in the locking position is spread significantly more evenly to the sensor side and to the spring side despite a comparatively large angle of lag.

Of preference, the radially elastic pivot bearing is formed integrally with the housing cover. This results in a considerably facilitated structure of the belt retractor, as no radially guided pivot bearing and no tensioning device for acting radially on the pivot bearing need to be provided in the housing cover any more.

The housing cover of the belt retractor may be especially elastically deformable. The radial elasticity of the pivot bearing can be realized in this way with little effort by deforming the housing cover and can be influenced via the material and the material thickness of the housing cover in a desired manner.

In one embodiment of the belt retractor a sensor device forming a radially pivotal pivot bearing for the sensor-side reel end is provided. Said sensor device is arranged at the side wall of the housing frame and may transfer the belt reel on the sensor side from the release position to the locking position in a known manner in a vehicle-sensitive or webbing-sensitive way.

According to a further embodiment of the belt retractor, each of the two wall openings includes frame-side locking teeth at its opening edge, said frame-side locking teeth having a geometrically identical design.

Radially adjacent to each of the opening edges of the two wall openings the belt reel may have reel-side locking teeth peripheral in the circumferential direction.

BRIEF DESCRIPTION OF THE DRAWINGS

Further features and advantages of the invention will be evident from the following description of preferred embodiments with reference to the drawings, wherein:

FIG. 9 shows a side view and a top view of a belt retractor according to the invention in a release position of the belt reel;

FIG. 10 shows a side view and a top view of the belt retractor according to FIG. 9 with the belt reel being deflected on the sensor side to the locking position; and FIG. 11 shows a side view and a top view of the belt retractor according to FIG. 9 in a locking position of the belt reel.

DESCRIPTION

Figure 1:
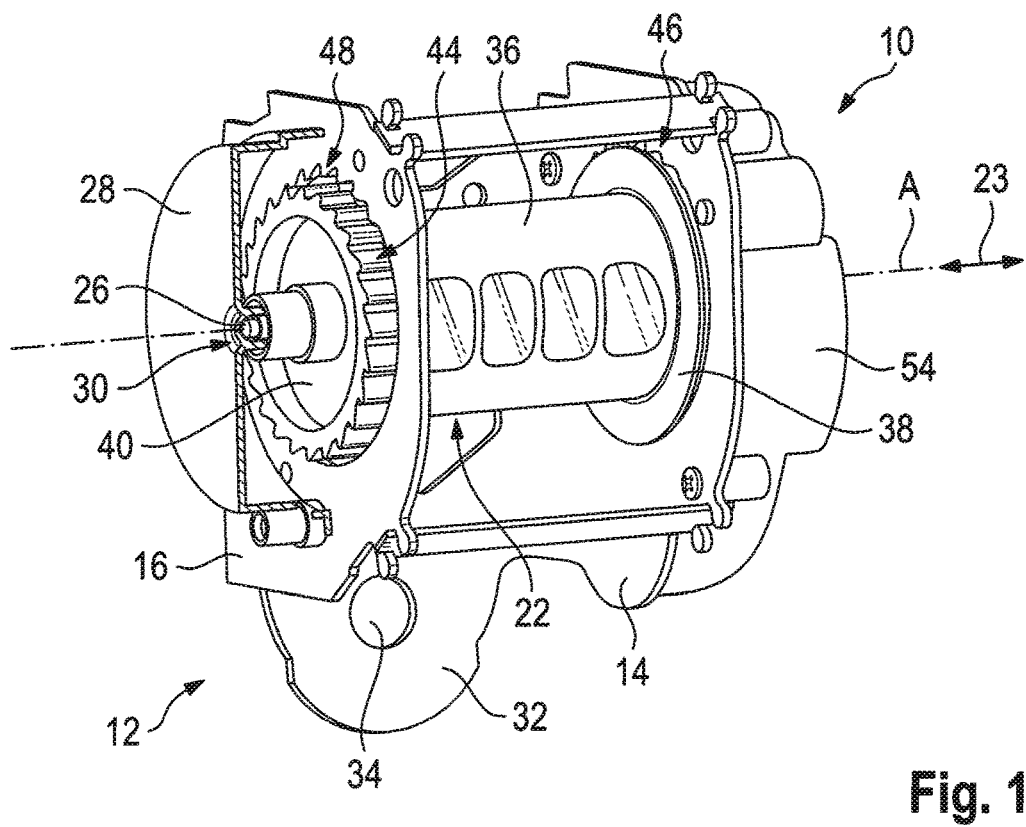
FIG. 1 shows a partially cut perspective view of a belt retractor according to the invention.
Figure 2:
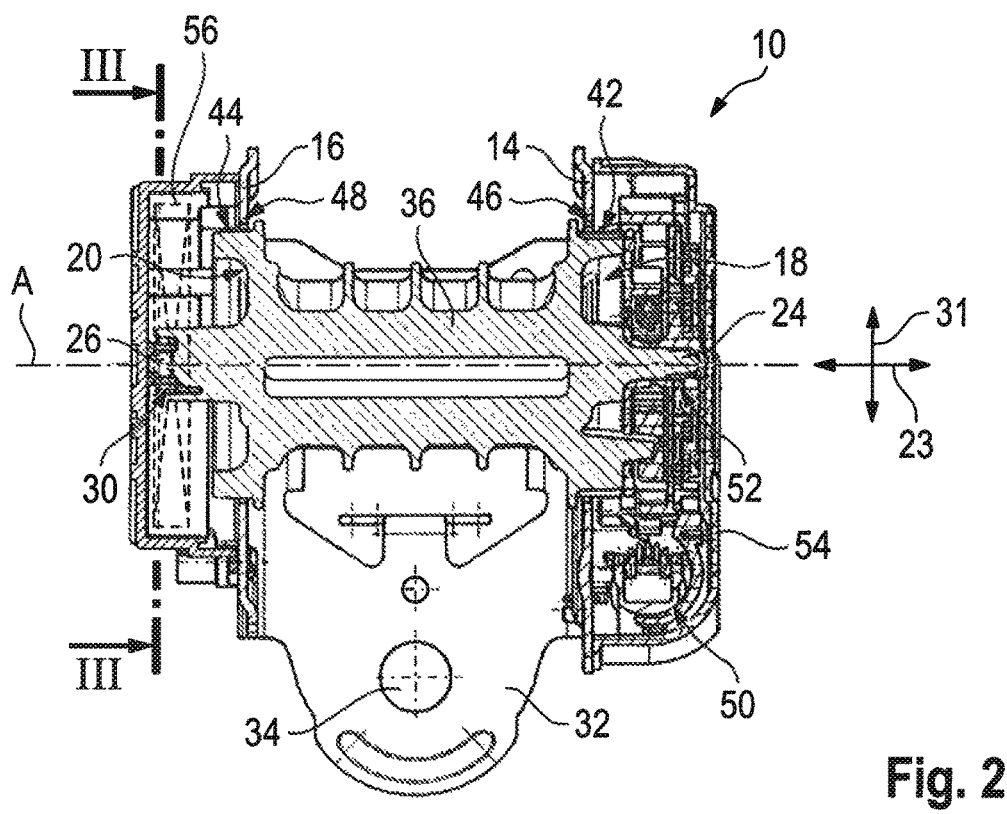
FIG. 2 shows an axial longitudinal section of the belt retractor according to FIG. 1.
Figure 3:
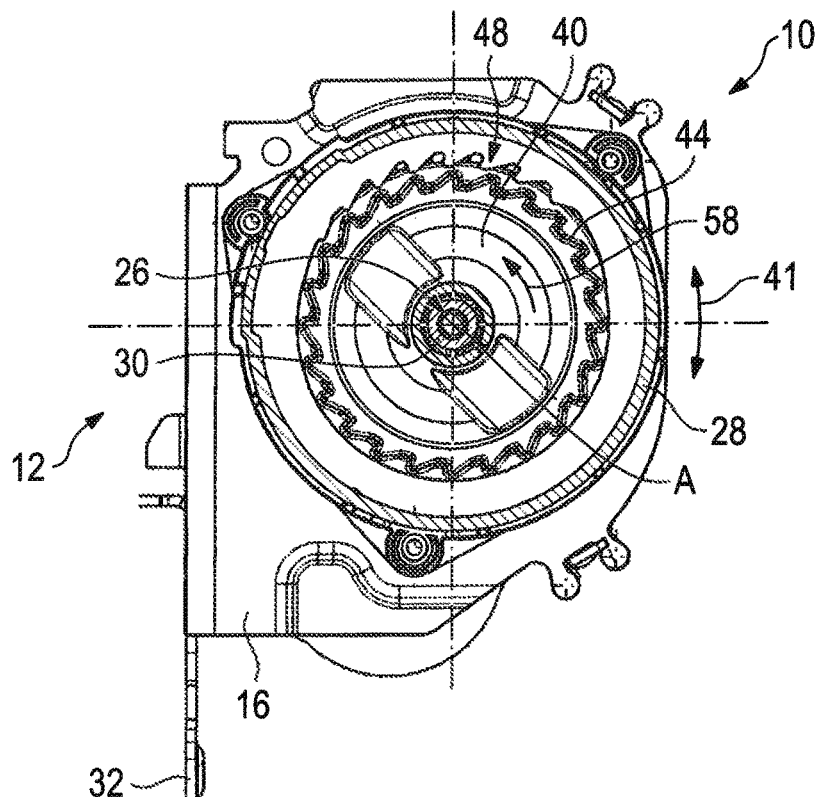
FIG. 3 shows a cross-section III-III of the belt retractor according to FIG. 2.

FIGS. 1 to 3 illustrate a belt retractor 10 for automotive vehicles, comprising a housing frame 12 which includes two opposed side walls 14, 16 each having a wall opening 18, 20, a belt reel 22 being rotatable about a reel axis A and extending in the axial direction 23 from a sensor-side reel end 24 through the wall openings 18, 20 of the housing frame 12 to an axially opposite spring-side reel end 26, as well as a housing cover 28 which is tightly connected to the housing frame 12 and forms a radially elastic pivot bearing 30 for the spring-side reel end 26, the spring-side reel end 26 of the belt reel 22 being fixed to the housing cover 28 in the radial direction 31 in a guide-free manner.

The housing frame 12 is substantially U-shaped and includes a back plate 32 as well as the two opposed side walls 14, 16 projecting from the back plate 32. When being mounted in the vehicle, the housing frame 12 is tightly mounted to a vehicle body (not shown), especially screwed with the vehicle body. According to FIGS. 1 and 2, for this purpose a fixing hole 34 is provided in the back plate 32 of the housing frame 12.

The belt reel 22 comprises, in the axial center, a reel body 36 for accommodating webbing (not shown) as well as reel flanges 38, 40 axially adjacent to both sides of the reel body 36 which are axially extending in the area of the wall openings 18, 20.

Each of the reel flanges 38, 40 of the belt reel 22 includes, radially adjacent to the opening edges of the two wall openings 18, 20, reel-side locking teeth 42, 44 peripheral in the circumferential direction 41, wherein the reel-side locking teeth 42, 44 are configured to be geometrically identical but are rotated relative to each other in the circumferential direction 41 by a fraction of a tooth pitch angle of the locking teeth 42, 44.

At their opening edge the two wall openings 18, 20 include respective frame-side locking teeth 46, 48, wherein the frame-side locking teeth 46, 48 are configured to be geometrically non-identical and in the axial direction 23 are located in series in a substantially congruent manner.

As indicated in FIG. 2, a pivot lever attached to the housing frame 12 and including a sensor device 50 which constitutes a radially pivotable pivot bearing 52 for the sensor-side reel end 24 is provided at the sensor-side reel end 24. Said sensor device 50 can be activated in the known manner to be vehicle-sensitive or webbing-sensitive, with the sensor-side reel end 24 being radially deflected after said activation during extension of webbing.

The belt reel 22 moves from its release position in which the belt reel 22 is freely rotatable within the housing frame 12 about the reel axis A on the sensor side to its locking position in which the reel-side locking teeth 42 engage in the frame-side locking teeth 48 and fixes the sensor-side reel end 24 to the housing frame 12 in a substantially rotationally fixed manner.

The sensor device 50 is accommodated in a pivot lever supported on the housing frame 12, concretely speaking on the side wall 16 of the housing frame 12.

At the spring-side reel end 26 of the belt reel 22 a drive spring 56 is provided for acting on the belt reel 22 in the webbing winding direction 58. In order to be able to clearly recognize the spring-side bearing essential to the invention of the belt reel 22 on the housing cover 28, the drive spring 56 commonly configured as a coil spring is indicated merely schematically in FIG. 2.

The drive spring 56 for the belt reel 22 is accommodated in the housing cover 28 which is tightly connected to the housing frame 12, especially to the side wall 14 of the housing frame 12.

The housing cover 28 forms the radially elastic pivot bearing 30 for the spring-side reel end 26, said elastic pivot bearing 30 being formed integrally with the housing cover 28 according to FIGS. 1 and 2. The housing cover 28 in this example embodiment is elastically deformable so that, when the spring-side reel end 26 is radially loaded, the pivot bearing 30 can radially move via deformation of the housing cover 28 and, where necessary, additional deformation of the housing frame 12 in the direction of webbing extension force F (cf. FIGS. 4 to 6).

Since the spring-side reel end 26 is fixed in the radial direction 31 without guiding on the housing cover 28, the spring-side reel end 26 moves along with the radially elastic pivot bearing 30 while deforming the housing cover 28 in the direction of the acting webbing extension force F.

Figure 4:
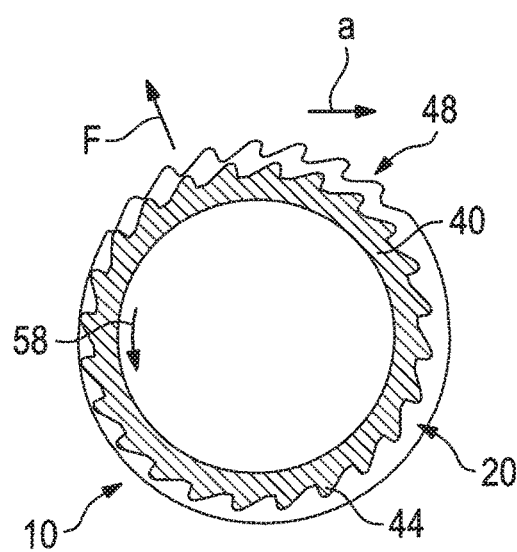
FIG. 4 shows a schematic spring-side view of the belt retractor according to FIGS. 1 to 3 in a load case.
Figure 5:
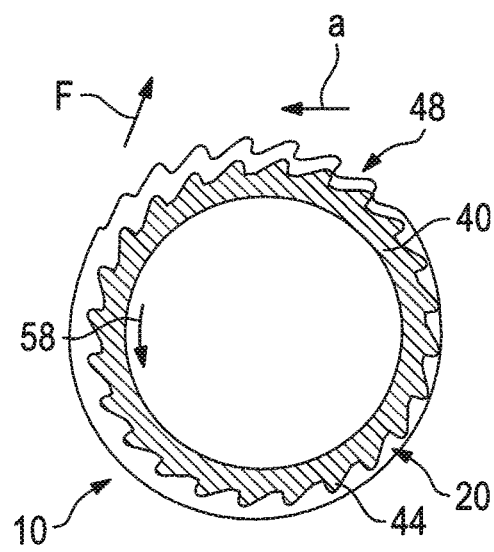
FIG. 5 shows a further schematic spring-side view of the belt retractor according to FIGS. 1 to 3 in a further load case.

Radial deflection of the spring-side reel end 26 is restricted by guiding the reel flange 40 in the wall opening 20. For the purpose of illustration, FIG. 4 shows a load case in which the webbing extension force F acting on the belt reel 22 has a lateral force component to the left and/or in which deceleration a of the belt retractor 10, concretely speaking of the housing frame 12 of the belt retractor 10, to the right will occur. On the other hand, in FIG. 5 a load case is shown in which the webbing extension force F acting on the belt reel 22 has a force component to the right and/or in which deceleration a of the belt retractor 10, concretely speaking of the housing frame 12 of the belt retractor 10, to the left will occur.

The direction of the webbing extension force F varies, for example, depending on the thickness of the webbing wound-up on the reel body 36 in the case of restraint.

Figure 6:
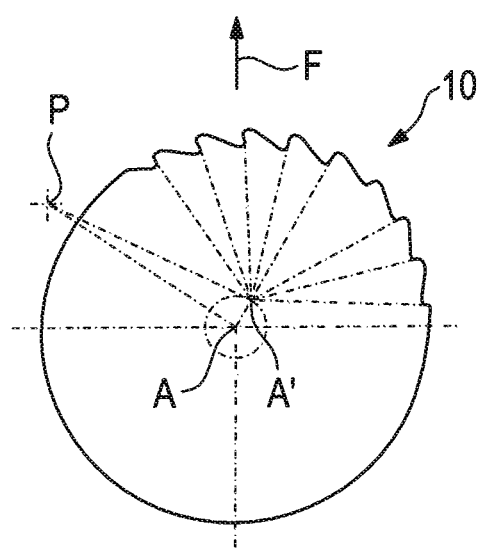
FIG. 6 shows a schematic sensor-side view of the belt retractor according to FIGS. 1 to 3 with an indicated radial deflection of the belt reel.

FIG. 6 illustrates a sensor-side deflection of the belt reel 22, the reel axis A at the sensor-side reel end 24 being swiveled from a position A (in the release position of the belt reel 22) about a defined pivot point P on the housing frame 12 and adopts a position A' (in the locking position of the belt reel 22).

Figure 7:
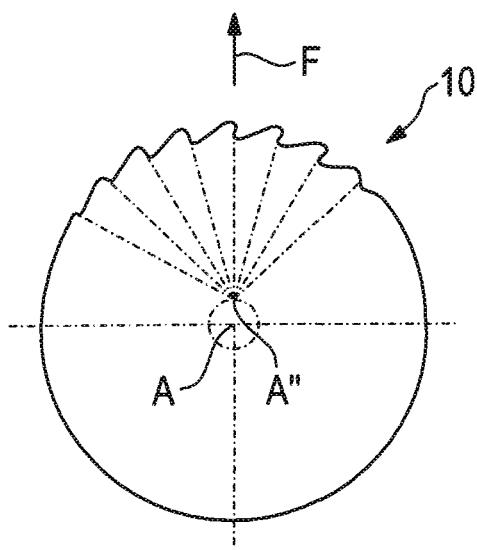
FIG. 7 shows a schematic spring-side view of the belt retractor according to FIGS. 1 to 3 with indicated radial deflection of the belt reel.

On the other hand, FIG. 7 illustrates a spring-side deflection of the belt reel 22, the reel axis A on the spring-side reel end 26 being shifted from a position A (in the release position of the belt reel 22) radially in the direction of the acting load (in FIG. 7 e.g. by webbing extension force F vertically upwards) and adopts a position A" (in the locking position of the belt reel 22).

Figure 8:
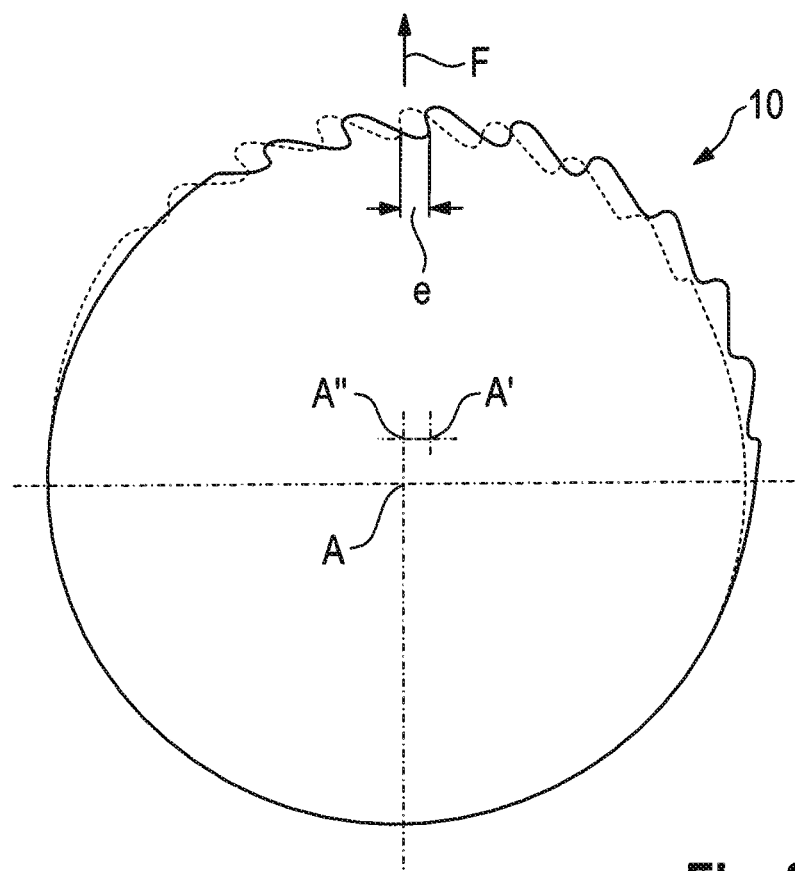
FIG. 8 shows an axial projection of the radial deflections of the belt reel according to FIGS. 6 and 7 to determine lag.

Said different deflections of the reel axis A shown in FIGS. 6 and 7 on the sensor side and on the spring side result in the reel axis A in the (sensor-side and spring-side) locking position of the belt reel 22 extending no longer in parallel to the reel axis A in the release position and the reel-side locking teeth 44, 46 being rotated relative to each other in the circumferential direction 41 by a fraction of a tooth pitch angle. The angle by which the locking teeth 42 on the spring-side reel end 26 lag the locking teeth 44 on the sensor-side reel end 24 is resulting from the different deflection of the reel axis A on the sensor side and the spring side, said difference in deflection being illustrated in FIG. 8 as a lag e. In this way, in the locking position of the belt reel 22 a more homogenous distribution of the locking moments between the sensor side and the spring side is obtained. In other words, the lagging angle on the spring side is closed already with a comparatively low moment load on the locking side and subsequently the moment loading is divided to the sensor side and the spring side.

Each of FIGS. 9 to 11 illustrates a side view and a top view of the belt retractor 10 during a locking operation of the belt reel 22.

According to FIG. 9, the belt reel 22 is in its release position in which it is supported to be freely rotatable about the reel axis A within the housing frame 12. Starting from said release position, the belt reel 22 is guided to its locking position initially only on the sensor side upon activation of the sensor device 50. On the spring side, the belt reel 22 has an articulated seat in its pivot bearing 30 in the form of a V bearing.

FIG. 10 illustrates a state of the belt retractor 10 in which the reel-side locking teeth 42 engage in the frame-side locking teeth 46 and the sensor-side reel end 24 is fixed to the housing frame 12 in a substantially rotationally fixed manner. With further increasing webbing extension force F the belt reel 22 is deflected by deformation of the housing cover 28 even on the spring side. The direction of the spring-side deflection is not radially guided and is strongly dependent on the direction of the webbing extension force F. Therefore, the angle about which the locking teeth 44 on the spring-side reel end 26 lag the locking teeth 42 on the sensor-side reel end 24 must be quite large and amounts to 4° to 10°.

According to FIG. 11, also the reel-side locking teeth 44 engage in the frame-side locking teeth 48 so that the belt reel 22 has reached its locking position both on the sensor side and on the spring side. From a top view of the belt retractor 10 (at the bottom of FIG. 11) it is evident that the reel axis A in the locking position according to FIG. 11 is inclined by an angle α vis-à-vis the reel axis A in the release position according to FIG. 9. The lag e (cf. FIG. 8) is compensated by said angle of inclination α. Accordingly, in the case of restraint on the sensor side and on the spring side a more balanced moment loading will occur than in the case of belt retractors 10 in which the belt reel 22 is forced into a locking position parallel to the release position by a spring-side radial guideway.

The invention claimed is:

1. A belt retractor for automotive vehicles, comprising:
   a housing frame (12) including two opposed side walls (16), each with a wall opening (18, 20) having frame-side locking teeth (46, 48),
   a belt reel (22) being rotatable about a reel axis (A) and extending in the axial direction from a sensor-side reel end (24) through the wall openings (18, 20) of the housing frame (12) to an opposite spring-side reel end (26) and having reel-side locking teeth (42, 44), and
   a housing cover (28) being tightly connected to the housing frame (12),
   wherein the locking teeth (44) at the spring-side reel end (26) lag the locking teeth (42) at the sensor-side reel end (24) in the webbing extension direction,
   and wherein the housing cover (28) forms a radially elastic pivot bearing (30) for the spring-side reel end (26),
   wherein the spring-side reel end (26) of the belt reel (22) is fixed in the radial direction without any further guideway on the housing cover (28),
   and wherein the radially elastic pivot bearing (30) is formed integrally with the housing cover (28).

2. The belt retractor according to claim 1, wherein the housing cover (28) is elastically deformable.

3. The belt retractor according to claim 1, wherein a sensor device (50) forming a radially pivotable pivot bearing (52) for the sensor-side reel end (24) is provided.

4. The belt retractor according to claim 1, wherein each of the two wall openings (18, 20) includes frame-side locking teeth (46, 48) at its opening edge, wherein the frame-side locking teeth (46, 48) are configured to be geometrically identical and are located in series in the axial direction in a substantially congruent manner.

5. The belt retractor according to claim 1, wherein radially adjacent to the opening edges of each of the two wall openings (18, 20) the belt reel (22) includes reel-side locking teeth (42, 44) peripheral in the circumferential direction, wherein the reel-side locking teeth (42, 44) are configured to be geometrically identical but are rotated relative to each other in the circumferential direction by a fraction of a tooth pitch angle.

6. The belt retractor according to claim 5, wherein the locking teeth (44) at the spring-side reel end (26) lag the locking teeth (42) at the sensor-side reel end (24) by an angle of at least 4° to 10° in the webbing extension direction.

* * * * *